United States Patent Office 3,317,462
Patented May 2, 1967

3,317,462
ETHYLENICALLY UNSATURATED DERIVATIVES OF 2 - HYDROXY-4-METHOXYBENZOPHENONE AND POLYMERS THEREOF
Albert I. Goldberg, Berkeley Heights, N.J., and Joseph Fertig and Martin Skoultchi, New York, N.Y., assignors to National Starch and Chemical Corporation, New York, N.Y., a corporation of Delaware
No Drawing. Filed Sept. 26, 1962, Ser. No. 226,464
14 Claims. (Cl. 260—47)

This invention relates to the preparation of ethylenically unsaturated derivatives of 2-hydroxy-4-methoxybenzophenone, the novel derivatives thus prepared, as well as to the polymers derived therefrom.

Polymers and copolymers prepared from ethylenically unsaturated derivatives of 2,4-dihydroxybenzophenone and its related compounds have a number of interesting properties which have prompted further investigation leading to the synthesis of additional vinyl monomers of this type. Thus, British Patent No. 885,986 relates to the preparation of the ethylenically unsaturated acryloxy and methacryloxy derivatives of 2,4-dihydroxybenzophenone by means of the reaction of the latter with either acrylyl or methacrylyl chloride. However, there are a number of factors which would appear to preclude any widespread commercial utilization of this particular synthetic route. Thus, for example, the acrylyl and methacrylyl chlorides are troublesome to prepare and are, accordingly, rather expensive and difficult to obtain. Moreover, the handling of these reagents presents many problems as they display a pronounced tendency towards spontaneous polymerization. The actual reaction between these acrylyl or methacrylyl chlorides and the 2,4-dihydroxybenzophenone is itself somewhat tedious inasmuch as it results in the evolution of hydrochloric acid which must be removed from the system by the initial presence, therein, of a tertiary amine such as pyridine. The resulting tertiary amine-hydrochloric acid adduct must then, in turn, be separated from the desired ethylenically unsaturated 2,4-dihydroxybenzophenone reaction product by employing a time consuming combination of extraction and distillation procedures.

It is thus the fundamental object of this invention to provide a novel class of ethylenically unsaturated derivatives of 2-hydroxy-4-methoxybenzophenone, said derivatives being capable of undergoing vinyl type polymerization reactions either alone or in the presence of other vinyl type comonomers. A further object of this invention involves the preparation of polymerizable derivatives of 2-hydroxy-4-methoxybenzophenone and their incorporation into a wide variety of polymers and copolymers so as to provide such polymers with improved heat stability and, more particularly, with improved light stability.

The novel compositions of our invention are the ethylenically unsaturated derivatives of 2-hydroxy-4-methoxybenzophenone corresponding to the formula:

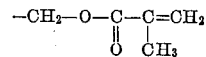

wherein X represents an ethylenically unsaturated radical selected from among the group consisting of the acrylyloxymethylene, i.e.

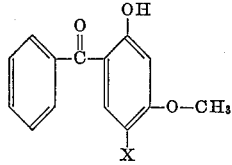

and methacrylyloxymethylene, i.e.

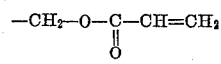

radicals.

As representative of the ethylenically unsaturated 2-hydroxy-4-methoxybenzophenone derivatives of our invention, one may list: 2-hydroxy-4-methoxy-5-acrylyloxymethylenebenzophenone and 2 - hydroxy - 4 - methoxy-5-methacrylyloxymethylenebenzophenone.

Thus, it is to be seen that the derivatives of our invention may be described as ethylenically unsaturated derivatives of 2-hydroxy-4-methoxybenzophenone; or, more specifically, as the acrylyloxymethylene and methacrylyloxymethylene derivatives of 2-hydroxy-4-methoxybenzophenone wherein said acrylyloxymethylene and methacrylyloxymethylene groups are substituted on the #5 position of the benzophenone nucleus.

All of the above listed compounds, as well as any others which may correspond to the above definition, are materials which are capable of readily undergoing vinyl type polymerization reactions. They are thus useful for the preparation of homopolymers and, more particularly, for the preparation of copolymers with a wide variety of other vinyl type comonomers. These copolymers are especially outstanding in regard to their superior light stability. This improved stability is imparted to these copolymers as a result of the presence therein of the 2-hydroxy-4-methoxybenzophenone moiety which is permanently bound into and inherently part of the resulting polymer molecule as a result of the incorporation therein of the ethylenically unsaturated 2-hydroxy-4-methoxybenzophenone derivatives of our invention.

In brief, the synthesis of our novel derivatives is accomplished by the base catalyzed reaction of 2-hydroxy-4-methoxy-5-chloromethylbenzophenone with an alkali metal salt, and particularly the sodium or potassium salt, of an ethylenically unsaturated carboxylic acid selected from among the group consisting of acrylic and methacrylic acid. This reaction is conducted by first dissolving the 2-hydroxy-4-methoxy-5-chloromethylbenzophenone in an appropriate organic solvent such as methyl ethyl ketone, dimethylsulfoxide or acetone. This is followed by the addition of the acrylate or methacrylate salt as well as a basic catalyst such as triethyl amine or other tertiary amines such as tributyl or trimethyl amine. A polymerization inhibitor such as benzoquinone or hydroquinone or its monomethyl ether may also be present so as to prevent the spontaneous polymerization of the desired end product.

Following the initial exothermic reaction, the mixture is maintained under agitation for an additional period of about 4 to 10 hours whereupon the solids are removed by filtration and the organic filtrate is then concentrated, under reduced pressure, at room temperature. For most purposes, including any subsequent polymerization reactions, these crude acrylyloxymethylene or methacrylyloxymethylene derivatives of 2-hydroxy-4-methoxybenzophenone can then be used without any further purification being necessary. However, where desired, the relatively small amount of unreacted 2-hydroxy-4-methoxy-5-chloromethylbenzophenone may be removed by such means as chromatographic separation techniques or by aqueous alkali or organic solvent extraction procedures.

With respect to proportions, the acrylate or methacrylate salt should be present in a 10–20% molar excess over the 2-hydroxy-4-methoxy-5-chloromethylbenzophenone while the concentration of the polymerization inhibitor and of the basic catalyst should be in the range of about 0.01 to 0.1% and 1–3%, respectively, by weight of the latter intermediate. By means of this reaction, the acrylyloxymethylene and the methacrylyloxymethylene derivatives of 2-hydroxy-4-methoxybenzophenone are produced in almost quanitative yields.

The intermediate for the above described reaction, i.e. the 2-hydroxy-4-methoxy-5-chloromethylbenzophenone, may be prepared by the chloromethylation of 2-hydroxy-4-methoxybenzophenone which is accomplished by reacting the latter with a 3–6 molar excess of concentrated hydrochloric acid and paraformaldehyde while in the presence of from about 0.5 to 3.0%, by weight, of a typical Lewis acid chloromethylation catalyst such as aluminum chloride, zinc chloride or concentrated sulfuric acid.

In utilizing our ethylenically unsaturated 2-hydroxy-4-methoxybenzophenone derivatives in the preparation of homo- and copolymers, there may be employed any of the usual vinyl polymerization methods which are well known to those skilled in the art and which is particularly suited for the polymer whose preparation is desired. Thus, such polymers may be prepared by means of free radical initiated processes utilizing bulk, suspension, solution, or emulsion polymerization techniques; or, they may be prepared by ionic catalysts or by means of stereo-specific catalysts such as those of the type developed by Ziegler.

The comonomers which may be utilized together with the above described ethylenically unsaturated 2-hydroxy-4-methoxybenzophenone derivatives for the preparation of the ultra-violet stable copolymers of our invention can be any ethylenically unsaturated monomer such, for example, as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; methacrylic acid; acrylamide; acrylonitrile; methacrylonitrile; butadiene; isoprene; vinyl propionate; dibutyl maleate; vinylidene chloride; vinyl chloride; vinyl acetate; ethylene; and propylene, etc. Any of these monomers may be used either alone or in combination with one another together with one or more of the benzophenone containing monomers of our invention.

In order to effectively withstand the effects of ultra-violet radiation, the copolymers of our invention should contain at least 0.1%, by weight, of these ethylenically unsaturated derivatives of 2-hydroxy-4-methoxybenzophenone. As for the maximum concentration, this will depend, of course, upon the particular comonomer as well as on the specific end use application of the resulting copolymer. However, in most cases a concentration of about 5.0%, by weight, will be fully adequate with economically effective results being obtained with a concentration in the range of about 1.0%. Larger quantities of up to about 10–20% may be used in order to obtain copolymers which are especially suited for use as coatings.

In any event, the polymers of our invention, whether prepared by means of bulk, suspension, solution, or emulsion polymerization techniques or by other means, are all characterized by their improved stability to light. This improved stability is fully equivalent, and in many cases superior, to the results obtained when extraneous ultra-violet absorbers are added to the comparable polymers which do not contain these 2-hydroxy-4-methoxybenzophenone derivatives. Moreover, all of the deficiencies which are inherent in the use of these extraneous stabilizers are completely avoided with the products of our invention. Thus, our novel polymeric compositions offer protection against the degradative effects of ultra-violet radiation while eliminating problems of volatility, toxicity and migration.

It should be pointed out at this time that although the process of our invention has been limited to the preparation of the monomeric derivatives, and to the polymers containing the latter, which result from the reaction between 2-hydroxy-4-methoxy-5-chloromethylbenzophenone with an alkali metal salt of either acrylic or methacrylic acid, it should also be noted that the alkali metal salts of crotonic acid and of the alkyl half esters of maleic, itaconic, fumaric and citraconic acids are also applicable for use in reactions of this type.

Moreover, although the above disclosure has been limited to the preparation of the acrylyloxymethylene and methacrylyloxymethylene derivatives of 2-hydroxy-4-methoxybenzophenone, it should be understood that the corresponding ethylenically unsaturated derivatives of the higher alkoxy homologs of the latter benzophenone intermediate may also be prepared by means of the process of our invention. Thus, for example, one may prepare the acrylyloxymethylene and methacrylyloxymethylene derivatives of such intermediates as 2-hydroxy-4-octoxybenzophenone; 2-hydroxy-4-dodecoxybenzophenone; and, 2-hydroxy-4-octadecoxybenzophenone.

The following examples will further illustrate the embodiment of this invention. In these examples, all parts given are by weight unless otherwise noted.

*Example I*

This example illustrates the preparation of 2-hydroxy-4-methoxy-5-acrylyloxymethylenebenzophenone, i.e.

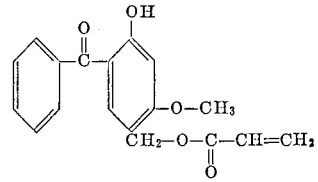

by means of the process of our invention.

The intermediate for this reaction, i.e. the 2-hydroxy-4-methoxy-5-chloromethylbenzophenone, was prepared by charging a reaction vessel with 228 parts of 2-hydroxy-4-methoxybenzophenone, 300 parts of concentrated hydrochloric acid, 160 parts of paraformaldehyde, and 4.0 parts of zinc chloride. This mixture was then heated for 14 hours at a temperature of 100° C. whereupon the organic layer was separated from the aqueous layer, washed with small portions of an aqueous sodium bicarbonate solution, extracted with diethyl ether and finally dried over magnesium chloride. This procedure thereby gave an 82% yield of 2-hydroxy-4-methoxy - 5 - chloromethylbenzophenone.

In a reaction vessel equipped with means for mechanical agitation, 27.6 parts of 2-hydroxy-4-methoxy-5-chloromethylbenzophenone were dissolved in 40 parts of acetone. To this solution, there was then added 11.0 parts of sodium acrylate, 0.2 part of triethyl amine, and 0.01 part of the monomethyl ether of hydroquinone. After the initial exothermic reaction, the resultant slurry was heated, under agitation, to a temperature in the range of 55° C. and maintained at that level for a period of 6 hours. When the reaction was complete, the solids were removed by filtration and the organic filtrate concentrated, at room temperature, under reduced pressure thus giving a yield of 29.0 parts of 2-hydroxy-4-methoxy-5-acrylyloxymethylenebenzophenone which was in the form of a viscous oil and which, by means of saponification equivalent analysis, indicated a purity of better than 92%.

*Example II*

This example illustrates the preparation of 2-hydroxy-4-methoxy-5-methacrylyloxymethlenebenzophenone, i.e.

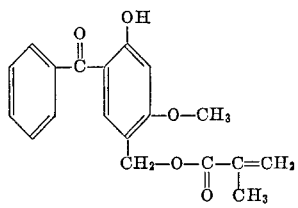

by means of the process of our invention.

In a reaction vessel equipped with means for mechanical agitation, 27.6 parts of 2-hydroxy-4-methoxy-5-chloromethylbenzophenone were dissolved in 40 parts of methyl ethyl ketone. To this solution, there was added 13.0 parts of potassium methacrylate, 0.2 part of tributyl amine, and 0.01 part of benzoquinone. After the initial exothermic reaction, the resultant slurry was heated, under agitation, to a temperature in the range of 80° C. and maintained at that level for a period of 4 hours. When the reaction was complete, the solids were removed by filtration and the organic filtrate concentrated, at room temperature, under reduced pressure thus giving yield of 30.0 parts of 2 - hydroxy-4-methoxy-5-methacrylyloxymethylenebenzophenone which was in the form of viscous oil and which by means of saponification equivalent analysis indicated a purity of better than 94%.

*Example III*

This example illustrates the preparation of one of the novel copolymers of our invention by means of a solution polymerization technique.

A toluene lacquer of a styrene:2-hydroxy-4-methoxy-5-methacrylyloxymethylenebenzophenone copolymer was prepared by charging the following ingredients into a reactor equipped with a reflux condenser as well as with means for mechanical agitation.

| | Parts |
|---|---|
| Styrene | 100.0 |
| 2-hydroxy-4 - methoxy-5-methcrylyloxymethylenebenzophenone | 0.5 |
| Tertiary butyl hydroperoxide | 0.5 |
| Toluene | 150.0 |

Under agitation, the above mixture was then refluxed at 110° C. for a period of 6 hours whereupon it was allowed to cool and discharged from the reactor. The resulting lacquer had a resin solids content of 37.5%, by weight, indicating a conversion of 94%. Films derived from this lacquer demonstrated greatly improved resistance to the degradative effects of ultra-violet radiation as compared with comparable films derived from a similarly prepared styrene homopolymer lacquer.

*Example IV*

This example illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 90:10:0.5 vinylidene chloride: ethyl acrylate:2 - hydroxy-4-methoxy-5-acrylyloxymethylenebenzophenone terpolymer was prepared by charging the following ingredients into a reactor equipped with a reflux condenser as well as with means for mechanical agitation.

| | Parts |
|---|---|
| Vinylidene chloride | 90.0 |
| Ethyl acrylate | 10.0 |
| 2 - hydroxy - 4 - methoxy - 5-acrylyloxymethylenebenzophenone | 0.5 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–55° C. for a period of 5 hours thereby resulting in a latex with a resin solids content of 50%, by weight, and an intrinsic viscosity, as determined in tetrahydrofuran at 30° C., of 0.82.

This latex was then used in the preparation of films having a wet thickness of 3.0 mils which were cast upon sheets of white paper. Various samples of these coated sheets were then exposed to 14 hours of direct sunlight. As a control for these tests, similarly coated sheets were exposed under the identical conditions; however, the coatings of these control sheets were derived from a 90:10 vinylidene chloride copolymer latex made with a recipe which was identical to that described above but which did not contain the benzophenone monomer.

The effect of the direct sunlight upon these resin films was determined, with respect to any color change which had occurred, by utilizing a Photovolt Reflectometer, Model #610; the latter being a device which records proportionately higher readings with the increased yellowing of the particular coatings being evaluated. The following table presents the results of these tests. In this table, the reflectometer readings which are given represent the difference between the readings obtained from the freshly prepared coatings as against the readings obtained subsequent to their exposure to the light source. Thus, a higher degree of discoloration will, of course, be indicated by a higher reading.

| # | Coating Resin | Reflectometer Reading |
|---|---|---|
| Control | 90:10 vinylidene chloride:ethyl acrylate | 24 |
| 1 | 90:10:0.5 vinylidene chloride:ethyl acrylate:2-hydroxy-4-methoxy-5-acrylyloxymethylenebenzophenone. | 2 |

The above data clearly indicated the remarkable degree of resistance to the degradative effects of ultra-violet radiation which is imparted to the novel copolymers of our invention.

*Example VIII*

This example illustrates the preparation of one of the novel homopolymers of our invention by means of a solution polymerization technique and also demonstrates how use is made fo the inherent resistance towards the degradative effects of ultra-violet radiation which is displayed by the films derived from the resulting lacquer.

An ethyl acetate lacquer of the homopolymer of 2-hydroxy-4 - methoxy-5-acrylyloxymethylenebenzophenone was prepared by charging the following ingredients into a reactor equipped with a reflux condenser as well as with means for mechanical agitation.

| | Parts |
|---|---|
| 2 - hydroxy - 4-methoxy-5-acrylyloxymethylenebenzophenone | 100.0 |
| Ethyl acetate | 200.0 |
| Benzoyl peroxide | 0.5 |

Under agitation the above mixture was then refluxed at 78° C. for a period of 8 hours whereupon it was allowed to cool and discharge from the reactor. The resulting lacquer had a resin solids content of 33.0%, by weight, indicating a conversion of 100%.

The above described homopolymer lacquer was diluted, by the addition of ethyl acetate, to a solids content of 5%, by weight. A film having a wet thickness of 3 mils, was then cast from this lacquer onto the surface of a 1.5 mil, dry thickness, film of a 90:10 vinylidene chloride:ethyl acrylate copolymer. The resulting laminate was then exposed to 14 hours of direct sunlight.

As a control for this test, a 1.5 mil, dry thickness, free film of 90:10 vinylidene chloride:ethyl acrylate copolymer was exposed under the identical conditions. The following table presents the results of these tests.

| # | Test Section | Reflectometer Reading |
|---|---|---|
| Control | Free film of the 90:10 vinylidene chloride:ethyl acrylate copolymer. | 35.5 |
| 1 | Laminate of the homopolymer of 2-hydroxy-4-methoxy-5-acrylyloxymethylenebenzophenone over the 90:10 vinylidene chloride:ethyl acrylate film. | 3.0 |

The above results thus serve to demonstrate how films derived from our novel ultra-violet resistant homopolymers may be used to protect other polymers from the effects of ultra-violet degradation.

Summarizing, our invention is thus seen to provide a novel class of ethylenically unsaturated benzophenone derivatives which may be used for the preparation of homo and copolymers characterized by their outstanding resistance to the degradative effects of ultra-violet radiation. Variations may be made in proportions, procedures and materials without departing from the scope of this invention as defined by the following claims.

What is claimed is:

1. An ethylenically unsaturated derivative of 2-hydroxy-4-methoxybenzophenone corresponding to the formula:

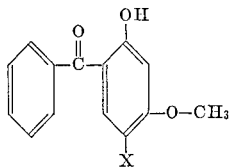

wherein X is an ethylenically unsaturated radical selected from the group consisting of the acrylyloxymethylene and methacrylyloxymethylene radicals, said acrylyloxymethylene and methacrylyloxymethylene radicals being linked to the 5 position of the benzophenone nucleus via their respective methylene moieties.

2. An ethylenically unsaturated derivative of 2-hydroxy-4-methoxybenzophenone selected from the group consisting of:
   2 - hydroxy - 4- methoxy - 5-acrylyloxymethylenebenzophenone, and
   2 - hydroxy - 4 - methoxy - 5-methacrylyloxymethylenebenzophenone.

3. 2 - hydroxy - 4 - methoxy - 5 - acrylyloxymethylenebenzophenone.

4. 2 - hydroxy - 4 - methoxy - 5 - methacrylyloxymethylenebenzophenone.

5. A composition comprising a polymer of at least one ethylenically unsaturated derivative of 2-hydroxy-4-methoxybenzophenone corresponding to the formula:

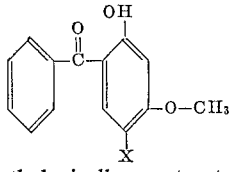

wherein X is an ethylenically unsaturated radical selected from the group consisting of the acrylyloxymethylene and methacrylyloxymethylene radicals, said acrylyoxymethylene and methacrylyloxymethylene radicals being linked to the 5 position of the benzophenone nucleus via their respective methylene moieties.

6. The composition of claim 5, wherein said ethylenically unsaturated 2-hydroxy-4-methoxybenzophenone derivative is selected from among the group consisting of:
   2-hydroxy - 4 - methoxy - 5 - acrylyloxymetyhlenebenzophenone, and
   2-hydroxy - 4 - methoxy - 5 - methacrylyloxymethylenebenzophenone.

7. A composition comprising a polymer of at least one ethylenically unsaturated monomer together with at least one ethylenically unsaturated derivative of 2-hydroxy-4-methoxybenzophenone corresponding to the formula:

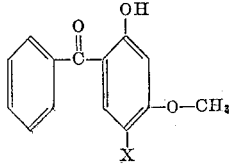

wherein X is an ethylenically unsaturated radical selected from the group consisting of the acrylyloxymethylene and methacrylyloxymethylene radicals, said acrylyloxymethylene and methacrylyloxymethylene radicals being linked to the 5 position of the benzophenone nucleus via their respective methylene moieties.

8. The composition of claim 7, wherein said ethylenically unsaturated 2-hydroxy-4-methoxybenzophenone derivative is selected from among the group consisting of:
   2-hydroxy - 4 - methoxy - 5 - acrylyloxymethylenebenzophenone, and
   2-hydroxy - 4 - methoxy - 5 - methacrylyloxymethylenebenzophenone.

9. The composition of claim 7, wherein said ethylenically unsaturated monomer is selected from the group consisting of styrene, alpha-methyl styrene; the acrylic and methacrylic esters of aliphatic alcohols, acrylic acid, methacrylic acid, acrylamide, acrylonitrile, methacrylonitrile, butadiene, isoprene, vinyl propionate, dibutyl maleate, dibutyl fumarate, vinylidene chloride, vinyl chloride, vinyl acetate, ethylene and propylene.

10. The composition of claim 7, wherein said ethylenically unsaturated 2-hydroxy-4-methoxybenzophenone moiety is present in a proportion of at least 0.1%, by weight.

11. A composition in accordance with claim 10, in which styrene is polymerized with 2-hydroxy-4-methoxy-5-methacrylyloxymethylenebenzophenone.

12. A composition in accordance with claim 10, in which vinylidene chloride and ethyl acrylate are polymerized with 2-hydroxy-4-methoxy-5-acrylyloxymethylenebenzophenone.

13. The method of preparing polymers resistant to the degradative effects of ultra-violet radiation which comprises the heating, in the presence of a free radical initiator, of at least one ethylenically unsaturated derivative of 2 - hydroxy-4-methoxybenzophenone corresponding to the formula:

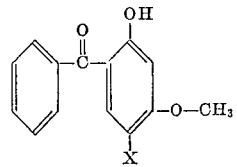

wherein X is an ethylenically unsaturated radical selected from the group consisting of the acrylyloxymethylene and methacrylyloxymethylene radicals, said acrylyloxymethylene and methacrylyloxymethylene radicals being linked to the 5 position of the benzophenone nucleus via their respective methylene moieties.

14. The method of preparing polymers resistant to the degradative effects of ultra-violet radiation which comprises the heating, in the presence of a free radical initiator, of at least one ethylenically unsaturated monomer together with at least one ethylenically unsaturated 2-hydroxy-4-methoxybenzophenone derivative corresponding to the formula:

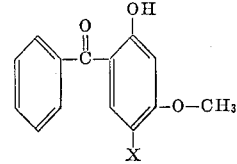

wherein X is an ethylenically unsaturated radical selected from the group consisting of the acrylyloxymethylene and methacrylyloxymethylene radicals, and acrylyloxymethylene and methacrylyloxymethylene radicals being linked to the 5 position of the benzophenone nucleus via their respective methylene moieties.

(References on following page)

References Cited by the Examiner

UNITED STATES PATENTS

| | | | |
|---|---|---|---|
| 2,961,426 | 11/1960 | Engelhardt | 260—47 |
| 2,962,533 | 11/1960 | Hardy | 260—591 |
| 3,058,953 | 10/1962 | McMaster | 260—47 |
| 3,107,199 | 10/1963 | Tocker | 260—47 |
| 3,121,704 | 2/1964 | Rice et al. | 260—47 |
| 3,126,414 | 3/1964 | Spaty | 260—591 |
| 3,131,166 | 4/1964 | Harris | 260—47 |

WILLIAM H. SHORT, *Primary Examiner*.

SAMUEL H. BLECH, LOUISE P. QUAST, J. C. MARTIN, *Assistant Examiners*.